July 3, 1962

G. A. MAY 3,041,896

INVERTED DRILLING MACHINE

Filed Oct. 25, 1960

George A. May
INVENTOR.

BY
Attorneys

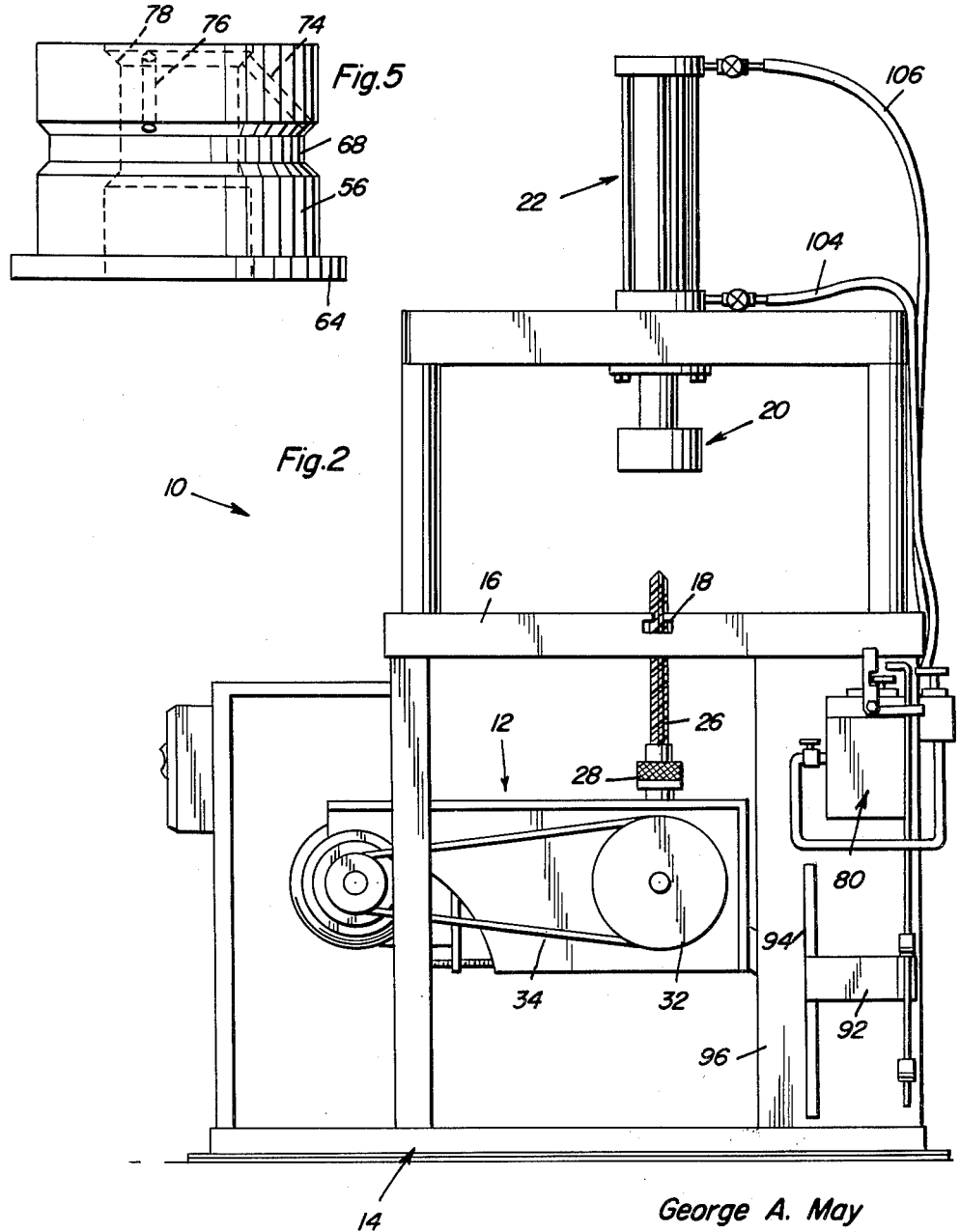

July 3, 1962 G. A. MAY 3,041,896
INVERTED DRILLING MACHINE
Filed Oct. 25, 1960 3 Sheets-Sheet 3

George A. May
INVENTOR.

BY *Clarence A. O'Brien*
*and Harvey B. Jacobson*
Attorneys

United States Patent Office 3,041,896
Patented July 3, 1962

3,041,896
INVERTED DRILLING MACHINE
George A. May, % May Machine Co., S. 7th St. at Vine, Lebanon, Pa.
Filed Oct. 25, 1960, Ser. No. 64,826
4 Claims. (Cl. 77—33.5)

This invention relates to a drilling machine wherein the rotating drill spindle is fed upwardly through the work to a desired height or depth.

It is therefore a primary object of this invention to provide a drilling machine wherein the work clamped to a horizontal table is drilled from below enabling feeding of the drill spindles in a more rigid and accurate manner than heretofore possible on the standard drill press.

Another object of this invention is to provide an inverted drilling machine arrangement whereby chips may fall out of the work being drilled and prevent clogging of the drill.

A further object of this invention is to provide an inverted drilling machine featuring a replaceable alignment bushing mounted in the table through which the rotating drill spindle extends, said alignment bushing accordingly accurately maintaining the drill spindle in vertical alignment throughout its upward progress or feeding through the work. The standard type of drill press accordingly does not have the benefit of such a bushing whereby the operator may perform drilling operations with a greater accuracy.

A still further object of this invention is to provide inverted drilling machines whereby the rotating drill spindle is fed upwardly through the work mounting table and coolant means is accordingly conveniently located for supplying coolant fluid to the rotating spindles by means of coolant directing channels in the alignment bushing to thereby remove the heat from the rotating drill spindles in a more efficient and complete manner than was possible theretofore.

An additional object of this invention is to provide an inverted drilling machine whereby the rotating drill spindle which is mounted on a carriage slidable on a rail and is suspended below the work table for upward feeding by means of a hydraulic cylinder mechanism which hydraulic cylinder mechanism is accordingly conveniently located for automatic operation by a hydraulic control system to feed the drill spindle a proper distance and at a controlled rate of movement and then return the spindle to its start position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a front elevational view of the drilling machine.

FIGURE 5 is an elevational view of the drill spindle alignment bushing.

Figure 1:
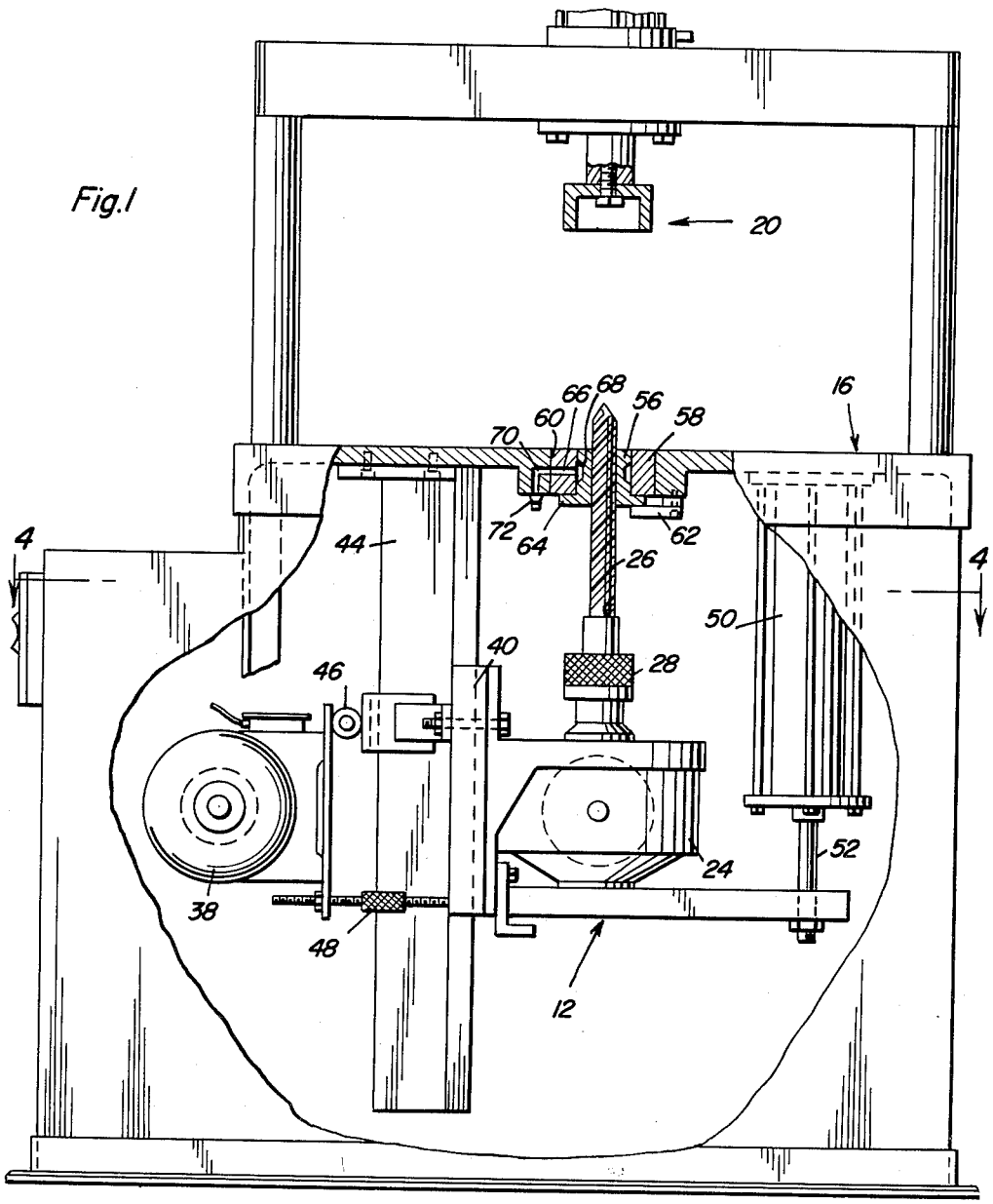
FIGURE 1 is a partial elevational view of the drilling machine with parts shown in section.

Referring now to the drawings in detail, it will be observed that the drilling machine generally indicated by reference numeral 10 is completely illustrated in FIGURE 2 with a front panel removed therefrom so that the carriage generally indicated by reference numeral 12 may be seen. The machine accordingly is mounted by means of a base frame generally indicated by reference numeral 14 upon which a horizontal table 16 is vertically spaced above the floor upon which table the work to be drilled is clamped. Accordingly, the table 16 may be provided with a plurality of key slots 18 by means of which clamping fixtures may be positioned on the table in order to hold the work. It will also be observed that a clamping holder 20 is provided which may be adjustably positioned in a vertical direction by a hydraulic mechanism 22 for clamping of work to the table 16.

Figure 4:
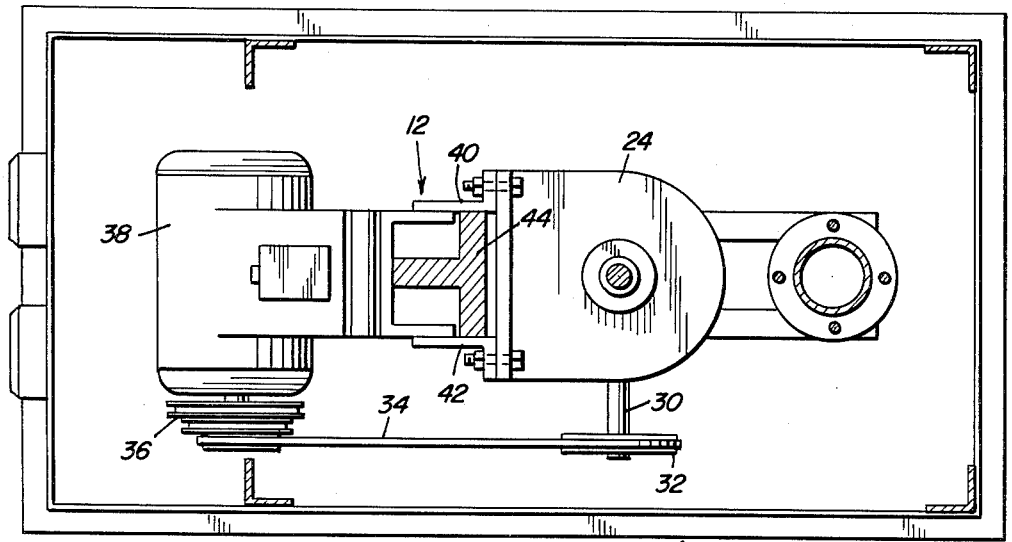
FIGURE 4 is a sectional view taken through a plane indicated by section line 4—4 in FIGURE 1.
Figure 3:
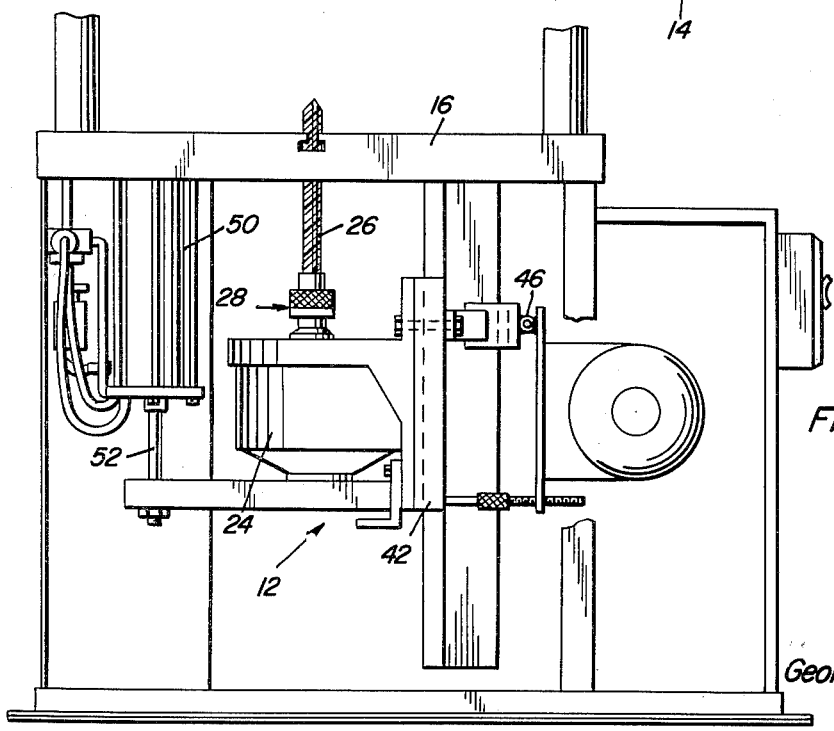
FIGURE 3 is a partial rear elevational view of the drilling machine.

The carriage mechanism 12 rotatably mounts a spindle drive mechanism mounted within a housing 24. Extending upwardly from the housing 24 mounted on the carriage 12 is the drill spindle 26 which is connected to the output of the drive mechanism within the housing 24 by means of chuck 28 in a conventional manner. As seen in FIGURES 2 and 4, an input shaft 30 extends into the drive housing 24 and is drivingly connected to the output or chuck 28 through bevel gearing (not shown) disposed within the housing 24, for transmitting drive from the input shaft 30 to the drill spindle 26. A pulley wheel 32 is accordingly connected to the outer end of the input shaft 30 which pulley wheel is belt connected by means of belt 34 to a multi-sheaved drive pulley 36 which is driven by an electric motor 38 laterally spaced from the housing 24. The multi-sheaved pulley 36 is therefore effective to provide a variable feed ratio drive from the motor 38 to the drill spindle 26 in order to accommodate different types of work or requirements.

It will be observed that the carriage 12 upon which the housing 24 is mounted and to which the motor 38 is connected includes track elements 40 and 42 which slidably engage a vertically disposed rail member 44 bolted to the table and suspended therebelow as more clearly seen in FIGURE 1. The electric motor 38 is hingedly connected at an upper end through hinge 46 to the carriage 12 on a side of rail member 44 opposite the housing 24 by means of the track elements 40 and 42, the lower end of the motor being adjustably spaced from the lower end of the carriage 12 by means of the screw and nut mechanism 48 which is thereby effective to adjust the tension of the driving belt connection 34 between the motor sheave 36 and the drive pulley 32. Also, more rigid vertical positioning is achieved by the foregoing rail load balanced arrangement.

In order to feed the carriage and hence the rotating drill spindle 26 upwardly into and through the work a hydraulic feed cylinder 50 is provided in parallel spaced relation to the housing 24. A piston rod 52 accordingly connects the carriage 12 to the piston disposed within the cylinder 50 whereby hydraulic fluid under pressure supplied to the lower end of the cylinder will raise the piston therein to thereby upwardly feed the carriage 12 and the rotating spindle 26 thereby.

It will be observed that inasmuch as the spindle is brought upwardly through the work, means mounted in the table is provided to guide and maintain the drill spindle 26 in true vertical alignment at all times. Accordingly a bushing 56 is provided for such purpose as more clearly seen in FIGURE 1. The bushing is insertable within a sleeve 58 fitted into an aperture 60 formed within the table 16. The bushing 56 is retained in its position by means of a lock element 62. It will be observed therefore that the bushing 56 includes a lower flange 64 for such purpose. It will also be observed in FIGURE 1 that the sleeve 58 includes a conduit bore 66 which is in communication with an annular recess 68 in the bushing 56 and also with a conduit bore 70 in the table 16. An inlet fitting 72 is accordingly provided for connecting the conduit 70—66 with a source of coolant fluid. Referring now to FIGURE 5, it will be observed that the bushing 56 includes bores 74 and 76 which communicate with the annular recess 68 and with the upper portion of the inner bore 78 through which the spindle 26 projects above the table surface. Accordingly, coolant fluid entering the annular recess 68 may enter the bore 78 into contact with the rotating drill spindles for removal of heat therefrom.

Referring to FIGURE 2 it will be observed that a hydraulic control mechanism generally designated by reference numeral 80 is provided for the purpose of automatically controlling the upward feeding of the carriage 12 by means of the feed cylinder 50 at a controlled rate of feed and for subsequent reversing of the feed cylinder movement to withdraw the drill. An arm member 92 is connected to carriage 12 and extends through the slot 94 of the panel 96. The control mechanism accordingly responds to movement of the carriage 12 for automatic control. Any suitable control system may be utilized to perform as hereinabove indicated, the particular control system however forming no part of the instant invention.

The hydraulic mechanism 22 is provided for adjustably positioning a work holding clamp device 20 by means of which work may be held any position above the spindle 26 when it is desired to hold the work above the surface of the table 16. Accordingly, the hydraulic mechanism 22 has connected thereto a pair of fluid conduits 104 and 106 for raising or lowering the work holding clamp device 20 and may also be provided with suitable control valve mechanism for selectively supplying fluid under pressure to the upper or lower ends of the hydraulic mechanism 22. It will also be apparent that the coolant fluid supplied to the fitting 72 may be derived from any suitable fluid source.

From the foregoing description, operation and use of the inverted drilling machine will be apparent. It will therefore be appreciated that by means of the machine arrangement of this invention, a more accurate drill feeding is made possible in view of the support provided therefor by the bushing mounted in the table 16 through which the drill spindles upwardly extend to the work. Also as a result of the table support for the drill spindle a more effective and convenient heat removal is possible by means of the fluid fed through the alignment bushing 56. Furthermore, clogging of the drill by chips is prevented. Also, by virtue of the upward feeding of the drill spindle through the work mounting table 16 other work holding devices such as work holding clamp 20 may be provided in conjunction with the machine enabling the machine to perform with greater versatility many different drilling operations.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A drilling machine comprising, frame means, table means mounted horizontally on said frame means, vertical rail means suspended downwardly from said table means, carriage means slidably mounted on one vertical side of said rail means below said table means, drill spindle means rotatably mounted in said carriage means and extending upwardly therefrom through said table means, variable ratio flexible drive means operatively connected to said carriage means for movement therewith on a side of the rail means opposite said one side and drivingly connected to said spindle means for rotation thereof, hydraulic feed means directly mounted on said table means in parallel spaced relation to said one side of the rail means and operatively connected to said carriage means for upwardly feeding said rotating drill spindle means through work located in spaced relation above the table means.

2. The machine as defined in claim 1, including replaceable bushing alignment means mounted in said table means for receiving said drill spindle means therethrough, and coolant directing means disposed within said bushing means for supplying fluid coolant to a portion of said rotating spindle means projecting above the table means.

3. The machine as defined in claim 2, including workholding clamp means mounted above the table means and hydraulic adjustment means operatively connected to the clamp means for vertical positioning thereof relative to the upwardly extending drill spindle means.

4. The machine as defined in claim 3, including hydraulic control means mounted on said frame means below the table means and operatively connected to the hydraulic feed means for automatically raising said spindle means to a desired height and then returning the spindle means to its start position.

References Cited in the file of this patent

UNITED STATES PATENTS

| | | |
|---|---|---|
| 2,420,759 | Stelz | May 20, 1947 |
| 2,814,215 | Carlson et al. | Nov. 26, 1957 |
| 2,826,944 | Hoffman | Mar. 18, 1958 |
| 2,922,323 | Weidner | Jan. 26, 1960 |